United States Patent [19]

Schroeder et al.

[11] Patent Number: 5,088,572
[45] Date of Patent: Feb. 18, 1992

[54] FORWARD CONTROL BUS CHASSIS WITH LOW ENGINE MOUNTING ASSEMBLY

[75] Inventors: Ronald C. Schroeder; Kjell Pedersen, both of Fort Wayne, Ind.

[73] Assignee: Navistar International Transportation Corp., Chicago, Ill.

[21] Appl. No.: 676,642

[22] Filed: Mar. 28, 1991

[51] Int. Cl.$^5$ ............................................. B60K 5/12
[52] U.S. Cl. ................................. 180/300; 180/68.4; 280/795
[58] Field of Search ............. 180/291, 299, 300, 68.4, 180/68.6; 280/795, 800; 165/67, 69

[56] References Cited

U.S. PATENT DOCUMENTS

| | | | |
|---|---|---|---|
| 1,754,927 | 4/1930 | Andren | 280/800 |
| 2,087,552 | 7/1937 | Rossmann | 280/800 X |
| 2,217,302 | 10/1940 | Agerell et al. | 180/68.1 |
| 4,137,982 | 2/1979 | Crews et al. | 180/68.4 |
| 4,315,540 | 2/1982 | Moranne | 180/68.4 X |

OTHER PUBLICATIONS

"TC 2000" Brochure Blue Bird Body Company, 1988 pp. 6, 7, 10.

"TC 2000 Service Parts Catalog" Blue Bird Body Company, 4-1989 pp. 112, 148.

*Primary Examiner*—Andres Kashnikow
*Assistant Examiner*—Michael Mar
*Attorney, Agent, or Firm*—Dennis K. Sullivan

[57] ABSTRACT

An engine mounting assembly includes a pair of rear engine mounting bracket assemblies having offset mounting surfaces, an engine flywheel housing having complementary mounting surfaces, and a front mounting bracket which together provide a three-point mounting structure resulting in a significantly lowered mounting of the engine on a forward control bus chassis. The front mounting bracket includes a single point, vibration-isolated, engine mount to a lowered frame crossmember to provide vibration isolation in any direction while the rear brackets provide vertical and fore-and-aft vibration isolation. The front mounting bracket further includes a lower mount for supporting a vehicle radiator while upper stabilizing rods connect the upper portion of the radiator to the upper portion of the engine to stabilize the desired vertical position of the radiator perpendicular to the engine fan axis.

8 Claims, 4 Drawing Sheets

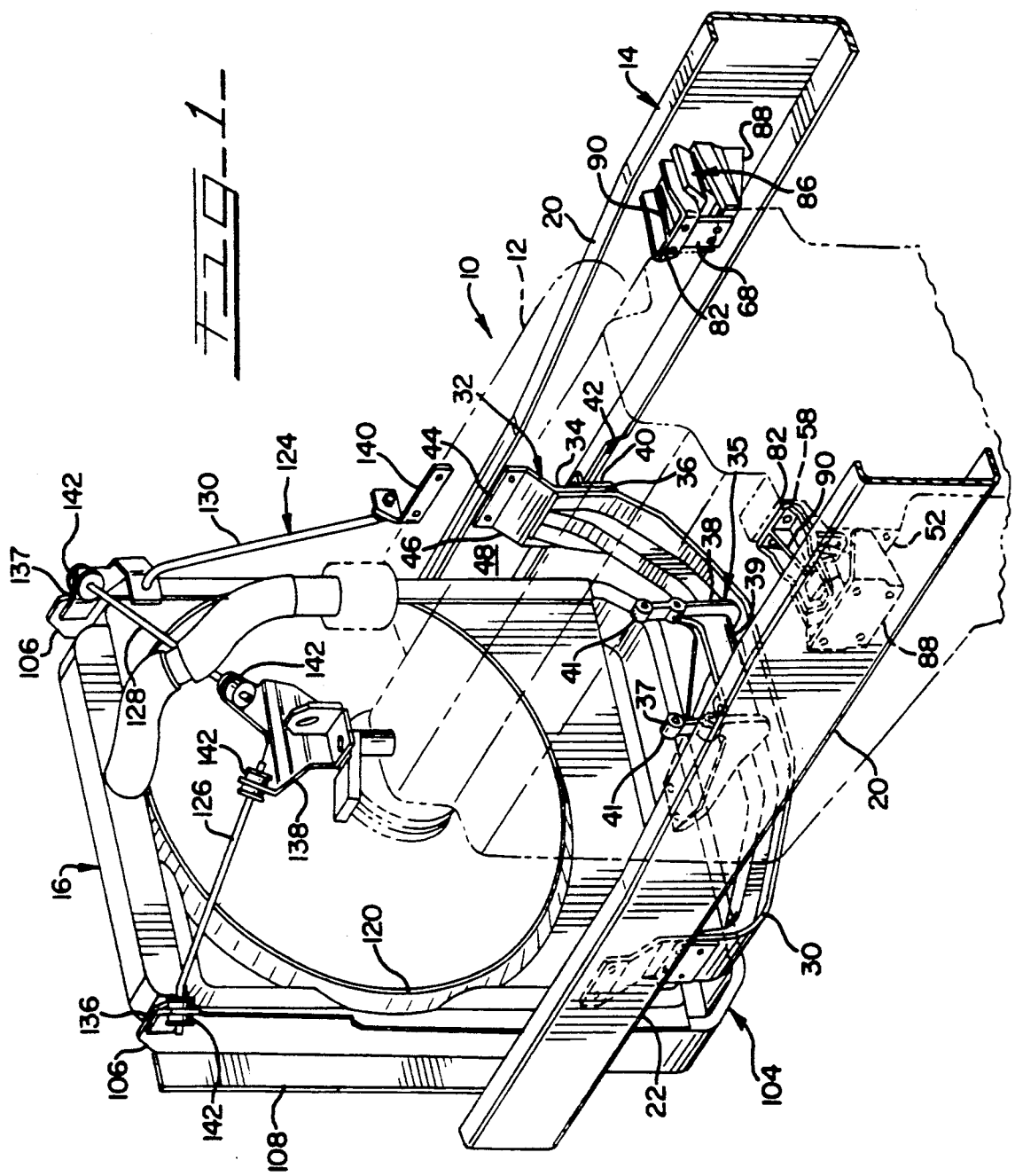

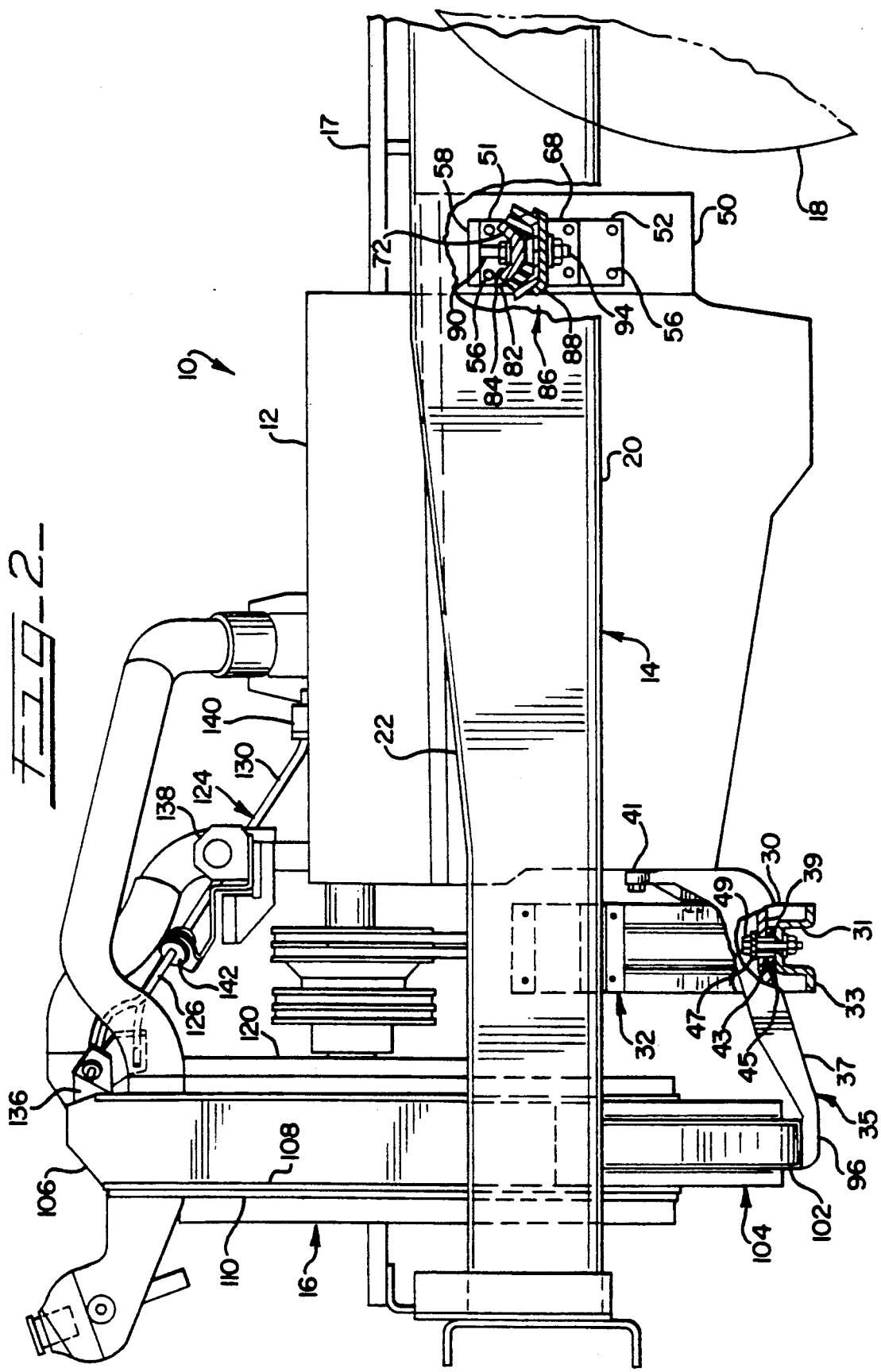

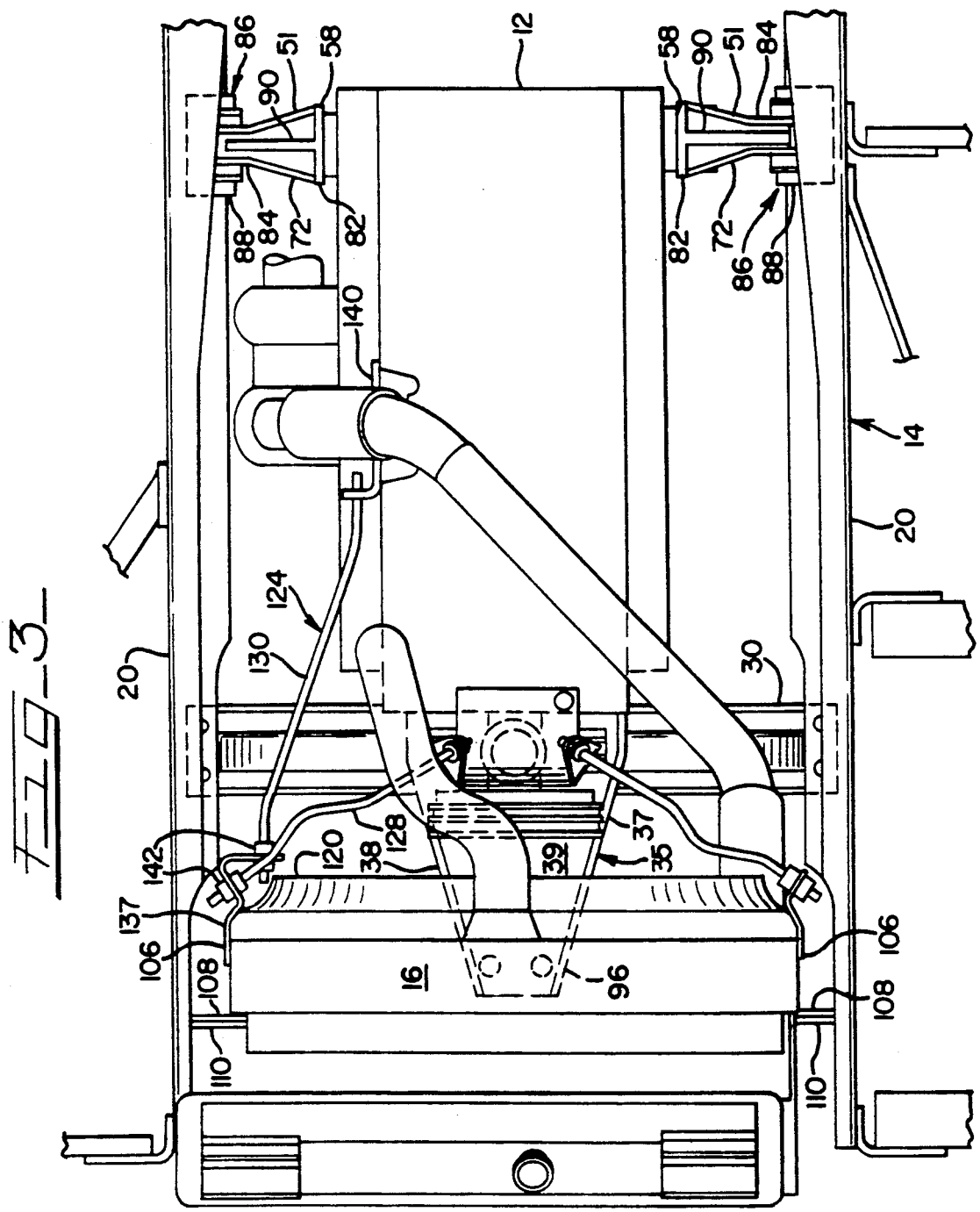

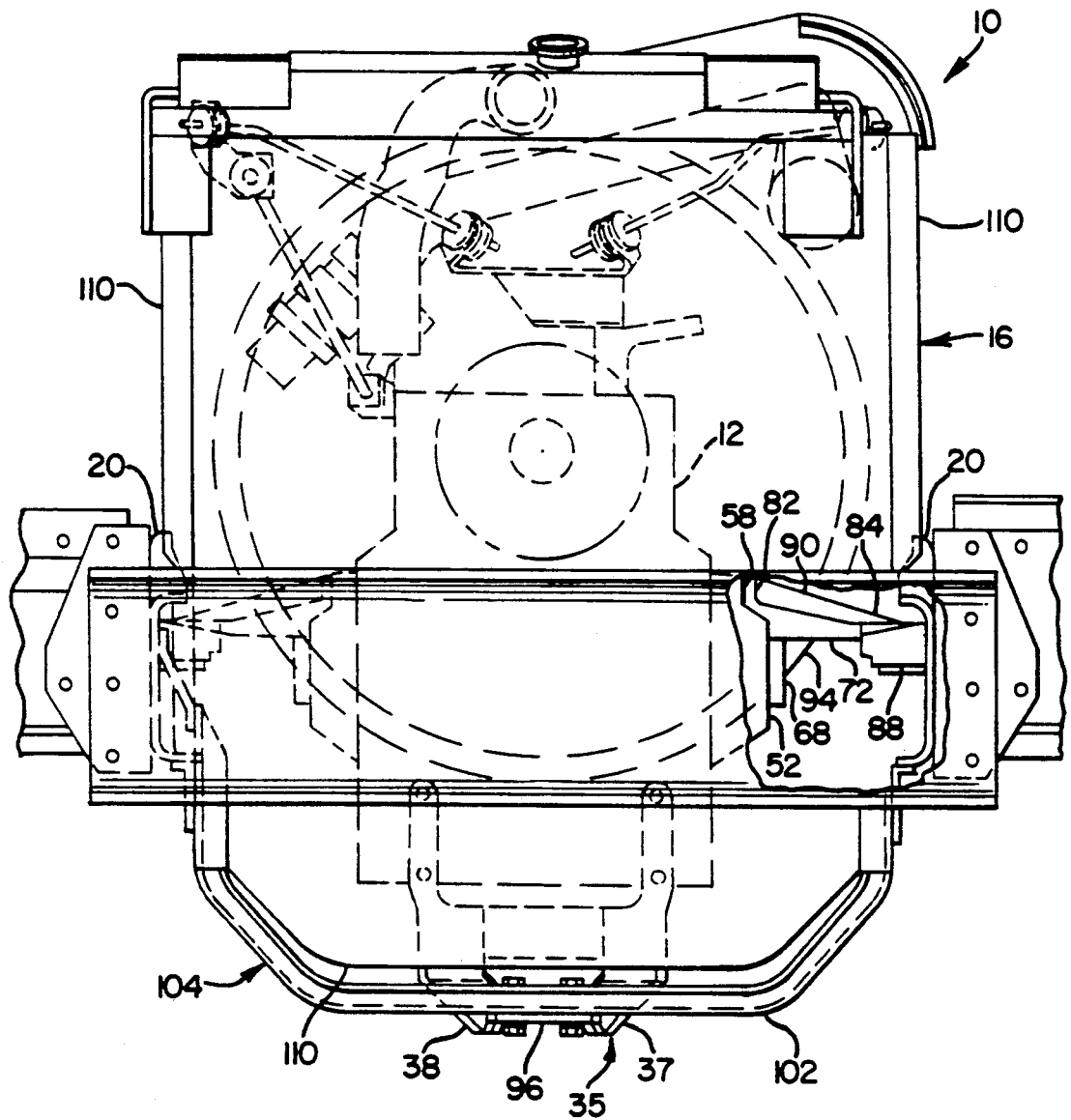

FORWARD CONTROL BUS CHASSIS WITH LOW ENGINE MOUNTING ASSEMBLY

BACKGROUND OF THE INVENTION

The present invention relates to a mounting assembly for an engine to be incorporated into a forward control bus chassis of the type used in flat-front school busses, the mounting assembly providing a significant lowering of the position of the engine relative to the chassis while providing adequate clearance thereunder to create a lower engine cover within the school bus body and providing for an engine mounted radiator and thereby permitting the engine and radiator to be removed as a unit from the front of the bus.

THE PRIOR ART

Heretofore, the engine of a flat front, forward control bus chassis has been mounted between the frame rails of the chassis in a manner wherein the engine mounts attach directly to the frame rails resulting in a higher engine position and requiring a large engine cover to be placed within the body of the bus in the area between the driver's station and the entry door to the vehicle. This positioning of the engine and cover therefor has caused difficulty for the driver when entering and leaving the driver's station and, more importantly, may hinder of the view of the lower front entry steps, creating a potential safety hazard in school bus applications. Further, because the radiator of the vehicle is typically mounted to the vehicle frame forward of the engine, removal of the engine for major repairs or rebuilding has been quite a chore inasmuch as the engine must be hoisted upwardly or lowered downwardly out of the engine compartment.

It is known to provide a flat front school bus wherein the engine is lowered by providing an underhanging front mounting bracket to which the front of the engine is mounted. A school bus of this type has been manufactured and sold under the model designations, "TC-2000", by the Blue Bird Body Company. It is also known from the Andren U.S. Pat. No. 1,754,927 to provide an automobile frame adapted to permit mounting the engine with a lower center of gravity including a drawn metal cross bar in the form of an inverted channel, curved downwardly between upstanding ends thereof which are adapted to engage the frame rails of the automobile. It is further known from U.S. Pat. No. 4,909,046 to mount a radiator, as well as the air conditioning condenser, from the front end of an engine.

SUMMARY OF THE INVENTION

According to the invention, there is provided an engine mounting assembly including a pair of rear engine mounting bracket assemblies having offset mounting surfaces, an engine flywheel housing having complementary mounting surfaces, and a front mounting bracket which together provide a three-point mounting structure resulting in a significantly lowered mounting of the engine on a forward control bus chassis. The front mounting bracket includes a single point, vibration-isolated, engine mount to a lowered frame crossmember to provide vibration isolation in any direction while the rear brackets provide vertical and fore-and-aft vibration isolation. The front mounting bracket further includes a lower mount for supporting a vehicle radiator while upper stabilizing rods connect the upper portion of the radiator to the upper portion of the engine to stabilize the desired vertical position of the radiator perpendicular to the engine fan axis.

The lowered mounting of the engine results in easier entry to and egress from the driver's station and, more significantly, provides the driver with a better view of the lower front entry steps to the bus, an important safety feature in school bus applications, while maintaining adequate ground clearance and an adequate approach angle. Further, direct mounting of the radiator to the engine provides for easier major servicing of the major drive train components by permitting the engine, transmission, and radiator to be withdrawn as a unit forwardly from the chassis.

BRIEF DESCRIPTION OF THE DRAWINGS

Other objects and advantages of the invention will become more apparent upon perusal of the detailed description thereof and upon inspection of the drawings in which:

FIG. 1 is a perspective view of a chassis incorporating the engine and radiator mounting system of the present invention, the engine shown in phantom lines to a vehicle chassis;

FIG. 2 is a side view partly in section of the engine mounted to the chassis frame by the mounting assembly of the present invention;

FIG. 3 is a top view of the chassis, primarily illustrating the upper radiator stabilizers; and, FIG. 4 is a front view partially cut away of the chassis incorporating the engine and radiator mounting assembly of the invention.

DESCRIPTION OF THE PREFERRED EMBODIMENT

Referring now to the drawings in greater detail, there is illustrated therein the engine mounting assembly 10 of the present invention. As shown in FIG. 1 and 2, an engine 12 mounted by the mounting assembly 10 is seated in horizontal orientation relative to the ground on laterally spaced, channel section, frame rails 20 of a mobile chassis 14, the chassis 14 being that of a forward control bus of the type having a flat front with a driver's station and the entrance doors positioned ahead of its front wheels shown partially at 18. A radiator assembly 16 is mounted to the engine 12 forwardly thereof in a manner to be described hereinafter.

The frame rails 20 of the bus chassis 14 have been modified to incorporate a downwardly tapered front end portion 22 by decreasing in the channel height from a normal .10 inches to approximately 7.5 inches to accommodate the lowered engine placement while still providing adequate frame strength.

To support the engine 12 in its position between the frame rails 20, a front cross bar member 30 having a cross section including an inverted U-shaped portion 31 with outturned flanges 33 formed on the legs thereof. The cross member 30 is of U-shaped configuration (FIG. 4), the medial portion thereof extending downwardly beneath the engine 12 and engaging mounting brackets 32 at each end of the cross member 30 which are configured to engage respectively one of the frame rails 20 along the tapered portion 22 thereof.

As shown in FIG. 1, each mounting bracket 32 includes an upright portion 34 affixed to an upstanding end flange 36 at the end of the cross member 30 as by bolting. An inverted L-shaped flange member 40 is affixed to an opposite surface of the upright portion 34 of the bracket 32 and includes a flange fixed to a lower edge flange 42 of the tapered portion 22 of the frame rail 20. The upper portion 46 of the bracket 32 is bent laterally outwardly and upwardly to form an offset vertical flange 44 which engages the web 48 of the frame rail 20.

A front engine mounting bracket 35 includes L-shaped left and right side flange members 37, 38 joined by a web 39 therebetween into an integral assembly. The vertical portions of the L-shaped side flange members each extend upwardly from the web 39 to distal ends having bosses 41 thereon provided with holes for bolting the bracket 35 to the front of the engine 12. The medial horizontal portion of the web 39 is provided with an aperture through which the metal spacer portion 43 of a vibration isolator extends, the spacer portion 43 being bonded within and extending from an elastomeric pad portion 45 of the isolator disposed between the web 39 of the bracket 35 and the cross member 30. An elastomeric coated upper snubber washer 47 is disposed above the web 39 and a bolt 49 extends through the snubber washer 47, the web 39, spacer 43, pad portion 45, and cross member 30 to a threaded end on which a locking nut is threaded to provide a snug joint. The vibration isolator is described in U.S. patent application Ser. No. 271,113, filed Nov. 14, 1988 which is incorporated by reference herein. Thus, a single point vibration isolator is provided for the front engine mount 35 which is effective in all directions and which as will be seen herein after also isolates the radiator frame from racking frame loads.

In order to accommodate the lowered mounting of the engine 12, a flywheel housing 50 of the engine 12 has been modified to raise the position of the rear mounting brackets relative thereto. In this respect, the flywheel housing 50 has typically been mounted to a bracket therefor along a vertical planar mounting pad surface 52 provided on each side of the flywheel housing 50, the planar surface 52 being provided with tapped holes 56 therein for aligning with mounting holes in the mounting bracket. With the lowered engine position provided herein, a conventional bracket will no longer align with the mounting surface 52 of the flywheel housing 50. To accommodate this circumstance, an additional boss 58 has been cut into the flywheel housing 50 at a level above the mounting surface 52, creating an offset planar secondary mounting surface. Two additional tapped bolt holes 56 are provided in boss 58.

The rear engine mounting brackets 51 include an upstanding portion 68, which abuts against the primary flywheel housing mounting surface 52, and a horizontally disposed substantially L-shaped bracket section 72 disposed above the upstanding portion 68, the bracket section 72 having a vertical flange 82 inwardly offset from the portion 68 to abut against the flywheel housing boss 58, suitable bolts attaching both the upstanding flange 68 and the vertical flange 82 respectively to the flywheel housing 50. To assure strength in the bracket 51, a center reinforcing rib 90 is provided along a top surface of the horizontal section 72 and a second rib 94 is provided between the horizontal section 72 and the upright portion 68.

The other end 84 of bracket 51 is mounted to a frame rail 20 of the chassis frame structure 14 through a rear engine mounting isolator 86 which is described in detail in U S. patent application Ser. No. 271,113, filed Nov. 14, 1988 which is incorporated by reference herein. As shown in FIG. 2, the rear engine mounting isolator 86 forms a truncated V-shaped seat for the engagement end 84 of the horizontal section 72 of bracket 51, which of essentially the same shape. The engine mounting isolator 86 is supported on a platform 88 secured to the web 48 of the frame rail 20 in any known manner.

Upon installation of the engine 12 by the mounting assembly 10 of the invention, a three point mounting system is created which allows for a significantly lowered positioning of the engine 12, minimizing the size of an engine cover required and creating a lower silhouette above the bus floor 17 in the area of the driver's station and the entrance doors of the bus. This lower silhouette creates significant benefits to the driver in terms of comfort and improved ergonomics, allowing entry to and egress from the driver's station to be made more easily, and in providing the driver a view of the lower entry steps, an important safety feature in school bus applications. It will be understood that the lowered engine 12 position still allows for an adequate ground clearance and maintains an adequate approach angle.

Turning now to the radiator assembly 16, the forward engine mounting bracket further includes a forwardly extending horizontal flange 96 which is secured to a horizontal frame member 102 of a substantially U-shaped radiator frame 104 which has upstanding legs 106 extending upwardly. Each upstanding leg 106 includes a forward radially outwardly directed flange 108 which engages with a forward vertical mounting flange 110 on a radiator 112 in such a manner that the radiator 112 rests on and within the confines of the frame 104. The frame 104 further includes a rear radially outwardly directed flange (not shown) on each upstanding leg 106 thereof to which a fan shroud 120 is mounted over a fan (not shown) of engine 12.

Inasmuch as the frame 104 is open at its an upper end and, as so far defined, is only engaged to the front engine mount 35 along horizontal frame member 102, an upper stabilizing system 124 is provided for securing the upper ends of the upstanding legs 106 of the frame 104 to the engine 12 of the vehicle. This is accomplished by using stabilizer rods 126, 128 and 130 which connect the radiator 16 to the engine 12. Left and right brackets 136 and 137 respectively are welded to the upper ends of the upstanding legs of the radiator frame 104. Two stabilizer rods 126 and 128 connect respectively between the brackets 136 and 137 and a central bracket 138 securely mounted to the top front portion of the engine 12, the engine bracket 138 also having an aperture thereto which functions as a lifting eye for the engine. The third stabilizer rod 130 also attaches to the right radiator bracket 137 but connects to a bracket 140 mounted to the exhaust manifold bolts on the right side of the engine 12. The function of the third stabilizer rod 130 is to prevent twisting movements of the radiator about the engine bracket 138. Each of the connections between the stabilizer rods 126, 128, 130 and the brackets 136, 137, and 138, but not bracket 140, is accomplished through an elastomeric isolator assembly 142 in order to isolate engine vibrations from the radiator frame 104. The stabilizer rods are provided with a stepped diameter adjacent the ends thereof which positions the isolator assembly 142 thereon and permits compression loading of the rod and a nut is threaded on the end of the rod after the isolator assembly 142 is installed to permit tensile loading of the rod. Since the radiator frame 104 of the vehicle is securely engaged to the engine 12 to form a unitary structure therewith, removal of the combined engine 12, transmission, and radiator assembly 16 is thus simplified, with the combined assembly being simply slid forwardly out of the engine compartment.

As described above, the mounting assembly of the present invention has a number of advantages, some of which have been described above and others of which are inherent in the invention. Also, modifications may be proposed to the mounting assembly without departing from the teachings of the present invention. Accordingly, the scope of the invention is only to be limited as necessitated by the accompanying claims.

What is claimed is:

1. In combination with a forward control vehicle chassis, said chassis including fore-and-aft extending parallelly spaced frame rails, an engine, and a radiator, apparatus for mounting said engine and said radiator to said chassis comprising:
   left and right rear engine mounts connected respectively between a flywheel housing of said engine and an adjacent frame rail, said rear engine mounts incorporating vibration isolating members therein;
   a front cross member secured to and extending between frame rails, said cross member having a U-shaped intermediate portion extending beneath said frame rails;
   a front engine mounting bracket having a rear end portion secured to a front portion of said engine and an intermediate portion secured at a single point through a vibration isolating means to said front cross member, said front engine mounting bracket extending forwardly beyond said cross member to a forward end portion having radiator mounting means thereat;
   a U-shaped radiator frame having a horizontal lower portion secured to said radiator mounting means of said forward end portion of said front engine mounting bracket and a pair of upstanding leg portions extending to distal ends;
   a plurality of stabilizing rod means extending respectively from each distal end of said leg portions to bracket means therefor secured to an upper portion of said engine; and
   a radiator secured within said radiator frame and operatively connected to said engine.

2. The invention in accordance with claim 1 wherein said flywheel housing includes a first planar mounting surface cut into a circumference thereof and a second planar mounting surface inwardly offset from and above said first mounting surface.

3. The invention in accordance with claim 2 wherein said rear mounts includes mounting brackets having an upstanding section and an upright flange portion offset from said upstanding section toward said engine, said upstanding section and said upright flange engaging respectively said first and second planar mounting surfaces of said flywheel housing of the engine.

4. The invention in accordance with claim 1 wherein said stabilizing rod means comprises a first stabilizing rod connected between one of said upstanding leg portions and a stabilizer bracket secured to a center forward top portion of said engine, a second stabilizing rod connected between the other of said upstanding leg portions and said stabilizer bracket, and a third stabilizer rod connected between one of said upstanding leg portions and a side bracket secured to a side portion of said engine.

5. The invention in accordance with claim 4 wherein each of said stabilizing rods are secured to said leg portions by a vibration isolating means.

6. The invention in accordance with claim 4 wherein said first and second stabilizing rods are secured to said stabilizer bracket by a vibration isolating means.

7. The invention in accordance with claim 4 wherein said stabilizer bracket incorporates an engine lifting eye.

8. The invention in accordance with claim 1 wherein a front engine isolator is disposed between said front mounting bracket and said front cross member, said front engine isolator isolating racking loads from being transmitted from said chassis frame to radiator frame.

* * * * *